No. 832,563. PATENTED OCT. 2, 1906.
G. H. WATERBURY.
PROCESS OF SEPARATING METALS FROM THEIR ORES.
APPLICATION FILED MAR. 27, 1905.
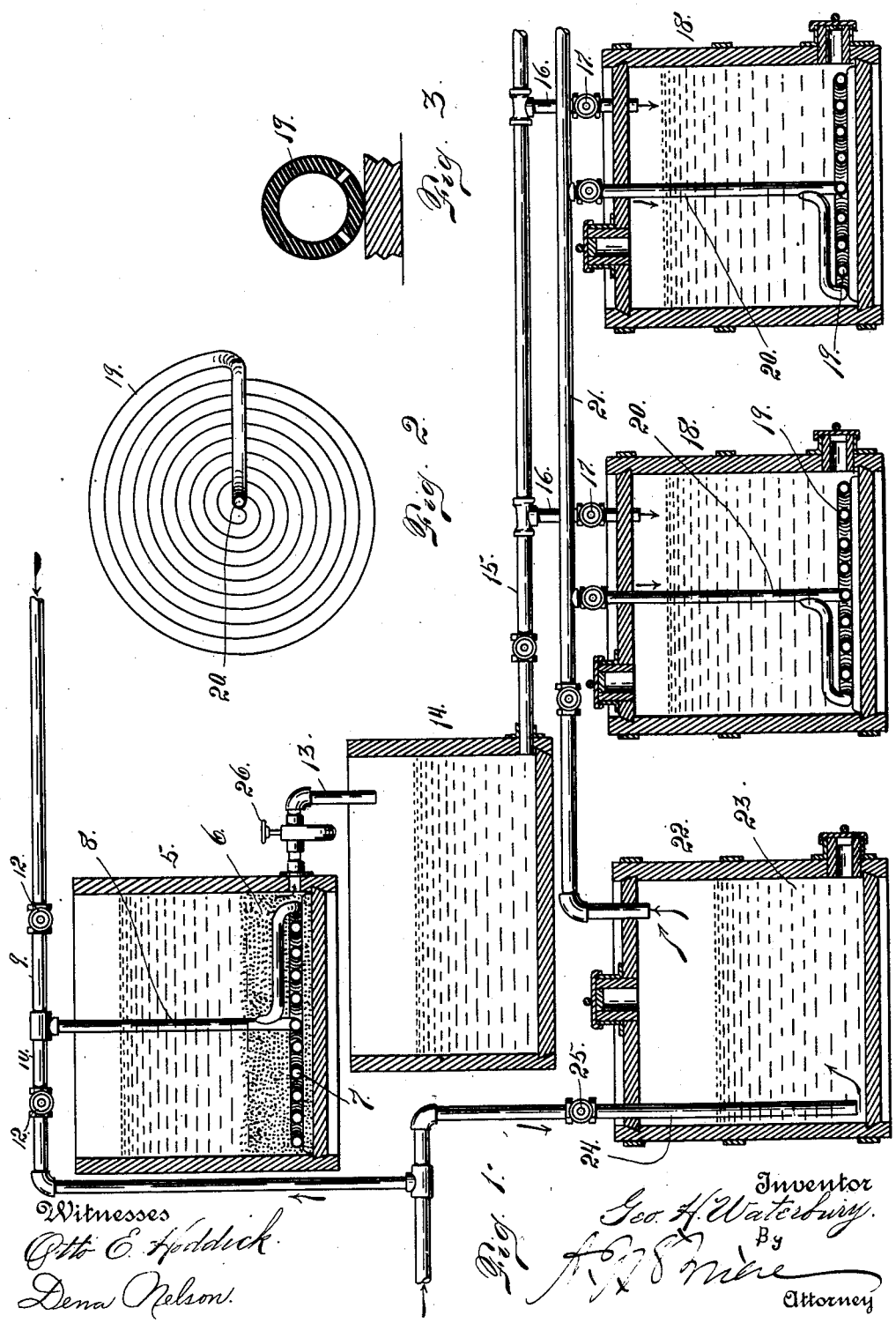

UNITED STATES PATENT OFFICE.

GEORGE HOBART WATERBURY, OF DENVER, COLORADO, ASSIGNOR OF ONE-THIRD TO JOHN J. HUDDART, OF DENVER, COLORADO.

PROCESS OF SEPARATING METALS FROM THEIR ORES.

No. 832,563.　　　　Specification of Letters Patent.　　　　Patented Oct. 2, 1906.

Application filed March 27, 1905. Serial No. 252,204.

*To all whom it may concern:*

Be it known that I, GEORGE HOBART WATERBURY, a citizen of the United States, residing in the city and county of Denver and State of Colorado, have invented a certain new and useful Process of Separating Metals from Their Ores; and I do declare the following to be a full, clear, and exact description of the invention, such as will enable others skilled in the art to which it appertains to make and use the same, reference being had to the accompanying drawings, and to the figures of reference marked thereon, which form a part of this specification.

My invention relates to a process of separating the more valuable metals from their ores. Belonging to this class of metals which my process is especially designed to treat may be mentioned platinum, gold, silver, copper, uranium, vanadium, &c.

In carrying out the process the ore is first pulverized to a suitable mesh, preferably from thirty to two hundred fine, or of such fineness that it may be passed through a screen having from thirty to two hundred meshes or openings to the square inch. After the ore has been thus pulverized it is placed in a suitable tank in the bottom of which is a corkscrew coil of perforated pipe, from one stem of which pipe connection is made with air under pressure and from the other stem with steam under similar pressure, whereby the steam and air mingle on their way to the perforated coil. In this tank is placed a solution composed of water, common salt, potassium or sodium nitrate, and sulfurous acid. The air and steam under pressure having been turned on, the pulverized ore is discharged into the tank, the mass being simultaneously heated and agitated as the ore may require. This agitation is continued until the metal contained in the ore is put into solution, after which this solution is drawn off and finally delivered to one or more precipitating-tanks. Into these tanks containing the metal values in solution a solution of sulfureted hydrogen gas $H_2S$ is forced by air under pressure, whereby the metal or metals contained therein are precipitated in sulfid form. When the ingredients forming the leaching solution are combined, a chemical action takes place between the salt, sulfurous acid, and crude nitrates, the said ingredients being brought together in suitable proportions. The sulfurous acid coming in contact with the salt and nitrates liberates the chlorin, which when combined with air and steam makes a form of hydrochloric-acid gas, a gas which it has been found will dissolve most metals very readily. The introduction of air into the precipitating tank or tanks is accomplished by means of a corkscrew coil of perforated pipe similar to that in the leaching-tank, the air being introduced under pressure at the bottom of the tank. The sulfureted hydrogen gas is formed in a generator composed of suitable material, as wood or metal. In this tank is placed a solution of sulfur and lime or sulfur and caustic soda, to which is added a small amount of sulfurous acid for the generation of the sulfureted hydrogen gas. The air when introduced to this tank under pressure forces the gas out of the generator through a pipe which is suitably connected with a precipitating tank or tanks, whereby the gas is introduced to the solution in the precipitating-tanks through the instrumentality of the perforated corkscrew coils. The oxygen of the air performs an important function in the precipitation of the metals.

Suitable apparatus for practicing my process will now be described, reference being had to the accompanying drawings, in which—

Figure 1 is a vertical section taken through the various tanks of the apparatus. Fig. 2 is a top view in detail of the corkscrew coil. Fig. 3 is a cross-section taken through the coil in connection with the bottom of the tank, the parts being shown on a larger scale.

The same reference characters indicate the same parts in all the views.

Let the numeral 5 designate the leaching-tank and 6 the ore therein. In the bottom of this tank is a perforated pipe-coil 7, with which is connected a stand-pipe 8, connected with pipes 9 and 10, leading in opposite directions. In each of these pipes is located a controlling-valve 12. The pipe 9 may be termed a "steam-pipe" or a pipe for introducing steam to the leaching-tank, while the pipe 10 may be termed an "air-pipe" or a pipe for introducing air to the tank. Near the bottom of the tank 5 is formed an orifice with which is connected a valve-controlled outlet 13, through which the solution from a leaching-tank may be drawn off and discharged into a tank 14. An outlet-pipe 15 is connected with this tank, and from it lead depending branch pipes 16, provided with valves 17. Through these branch pipes 16 the solution containing the metal values is discharged into the precipitating-tanks 18, each of which contains a corkscrew coil 19, connected with a valve-controlled stand-pipe 20. These pipes 20 are connected with a conduit 21, leading from a tank 2, containing a solution 23 of sulfureted hydrogen gas. Leading downwardly into the bottom of the tank 23 is a pipe 24, provided with a valve 25, through which air may be introduced to the bottom of the tank for the purpose of forcing the sulfureted hydrogen gas into the precipitating-tanks 18, as heretofore explained, whereby their contents are thoroughly agitated.

In the practice of the process the leaching solution is first placed in the tank, after which the air and steam are turned on. The ore to be treated is then discharged into the solution, the latter being simultaneously heated and agitated until the metals in the ore are placed in solution. A valve 26 in the outlet 13 is then opened and the solution drained off into a tank 14, from which it is carried to the precipitating-tanks 18, into which the sulfureted hydrogen gas is introduced through the instrumentality of the conduit 21, the stand-pipes 20, and the coils in the bottoms of the tanks, as heretofore explained.

Having thus described my invention, what I claim is—

1. The herein-described leaching process consisting in placing suitably-pulverized ore in a tank containing a solution composed of water, common salt, alkali-metal nitrate and sulfurous acid, and subjecting the pulp thus formed to the action of air and steam simultaneously introduced.

2. The herein-described process of separating metals from their ores, consisting in placing the ore to be treated in a solution composed of water, common salt, alkali-metal nitrate and sulfurous acid, subjecting the ore to be treated to heat and agitation simultaneously, whereby the metallic values are dissolved; drawing off the solution, and finally precipitating the metallic values by the introduction of sulfureted hydrogen gas.

3. The herein-described process of separating valuable metals from their ores, consisting in placing the ore to be treated in a solution composed of water, salt, alkali-metal nitrate and sulfurous acid, subjecting the same to heat and agitation by the simultaneous introduction of air and steam; drawing off the solution and precipitating the metallic values by the introduction to the solution of sulfureted hydrogen gas, the gas being forced into the solution by air under pressure.

In testimony whereof I affix my signature in presence of two witnesses.

GEORGE HOBART WATERBURY.

Witnesses:
A. J. O'BRIEN,
DENA NELSON.